United States Patent
Warshawsky

[15] 3,679,236
[45] July 25, 1972

[54] ALT AZIMUTH SWIVEL CONSTRUCTION

[72] Inventor: Jerome Warshawsky, 3285 Bertha Drive, Baldwin, N.Y. 11510

[22] Filed: Oct. 16, 1970

[21] Appl. No.: 81,393

[52] U.S. Cl.................285/39, 285/164, 285/184, 285/282, 285/DIG. 8, 287/12
[51] Int. Cl........................................F16l 27/00
[58] Field of Search.............285/DIG. 8, 164, 282, 39, 184; 287/12, 21, 87

[56] References Cited

UNITED STATES PATENTS

| 3,104,897 | 9/1963 | Berger | 285/DIG. 8 |
| 3,204,990 | 9/1965 | Blakely | 285/282 X |
| 3,186,736 | 6/1965 | Warshawsky | 285/39 |
| 2,298,176 | 10/1942 | Schwartz | 285/DIG. 8 |
| 2,632,660 | 3/1953 | Krauthamer | 285/DIG. 8 |

Primary Examiner—Thomas F. Callaghan
Attorney—Ernest A. Greenside

[57] ABSTRACT

A swivel joint fitting for lighting fixtures comprises a tubular mounting base telescopingly connected by a swaged rotatable joint to a housing for relative axial rotation therewith through an arc short of 360° as the azimuthal swivel component. A ball, mounted in the housing and having a stem extending through a semicircular slot in a dome-shaped end of the housing, provides movement through an arc of 180° as the altitudinal swivel component, permitting a full right angular bend. A compression spring simultaneously provides frictional drag of predetermined force against the altitudinal and azimuthal movement.

11 Claims, 7 Drawing Figures

PATENTED JUL 25 1972 3,679,236
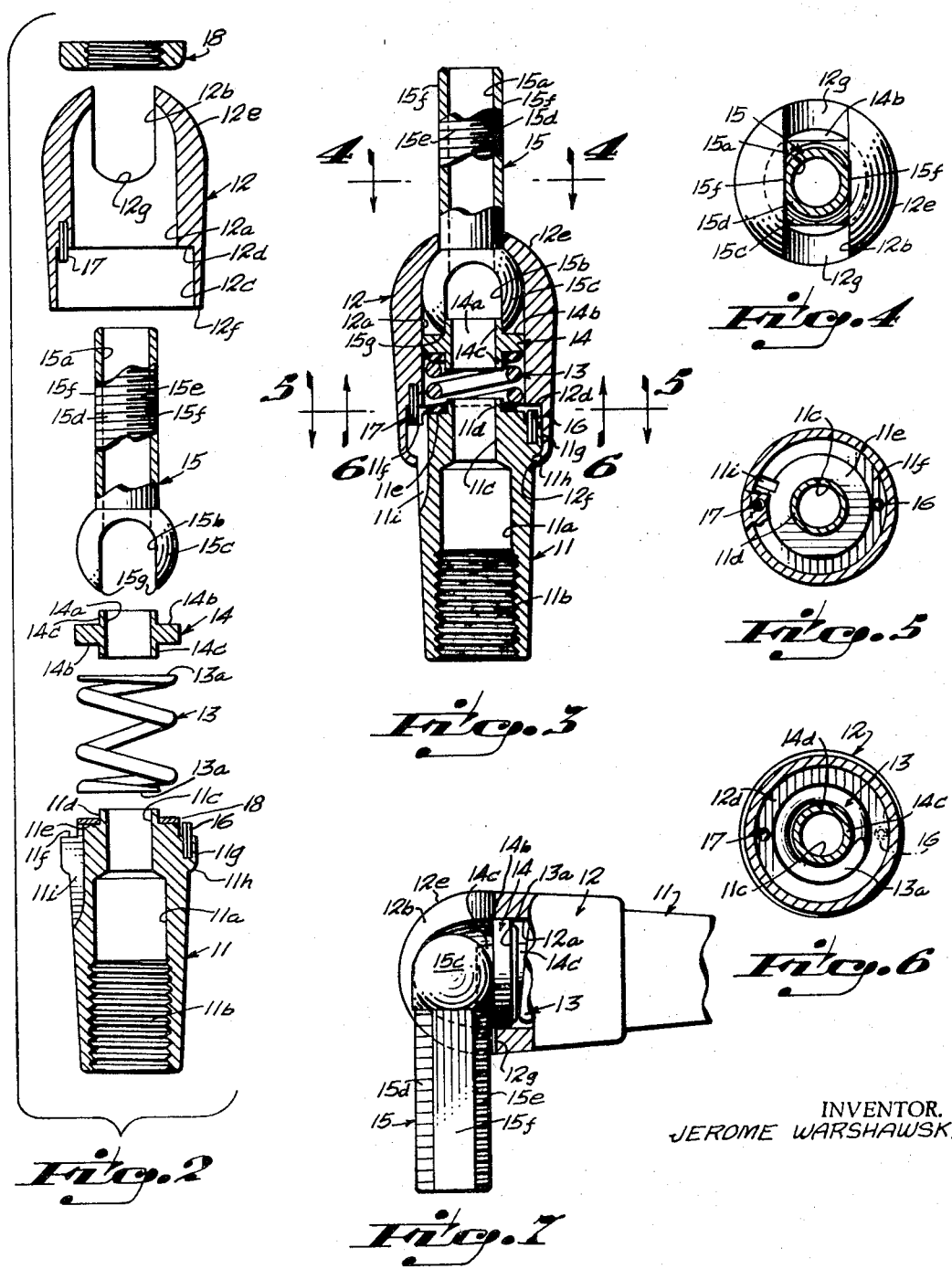
INVENTOR.
JEROME WARSHAWSKY

ALT AZIMUTH SWIVEL CONSTRUCTION

BACKGROUND OF THE INVENTION

1. Field of the Invention

The invention relates to swivel joint fittings through which electric wiring extends and more particularly to the accomplishment of a substantially universal movement including a full 90° bend in almost any direction by combining altitudinal and azimuthal relative movement.

2. Description of the Prior Art

This invention is an improvement of the swivel joint fitting described in my prior U.S. Pat. No. 3,186,736 wherein, as in many of the other prior art devices, the axial bend is limited to much less than a right angle. Other prior art devices utilize a double ended ball and socket to accomplish the desired right angle bend, while other alt-azimuth swivels in current use utilize pivot pins, which this invention seeks to avoid, and have trouble in maintaining the set positions of the swivel, being subject to accidental displacement.

SUMMARY OF THE INVENTION

Among the objects of the invention is to provide an alt-azimuth swivel joint fitting of improved construction which shall avoid the disadvantages of, and objections to, the prior art devices hereinbefore mentioned. The swivel comprises few and simple parts, namely, a base, a dome-shaped housing, a swivel ball member having a stem, a sleeved washer and a compression spring, all having axial bores for the passage of electric wiring therethrough, and, except for the spring, which may be machined from bar stock brass or the like to provide a high quality, dependable and readily usable unit for manufacturers of lamps. A joint, which is formed by swaging a flange over a collar, facilitates assembly of the swivel and serves both as the sole means for retaining the parts in such assembly under preset spring pressure and for providing relative axial rotary movement between the base and dome-shaped housing as the azimuthal swivel component. The stem of the swivel ball member projects through a semi-circular slot formed in the housing with the ball portion riding between one face of the washer and the interior dome-shaped surface of the housing. The compression spring, acting between the opposite face of the washer and the interior surface of the base, simultaneously exerts pressure on the ball portion and rotary joint providing a predetermined friction drag against accidental displacement from desired set positions of the swivel. One or more thin flat washers may be interposed between the compression spring and the interior surface of the base to reduce the effective friction drag on the azimuthal swivel component for easier operation of the swivel without sacrificing any of the weight carrying capability of the altitudinal swivel component.

BRIEF DESCRIPTION OF THE DRAWING

FIG. 1 is a side fragmentary view of a lamp assembly showing the swivel joint fitting embodying the invention interposed between a wire conduit type lamp arm or section and a lamp receptacle.

FIG. 2 is an exploded view of the swivel joint fitting taken in section substantially on line 2—2 in FIG. 1 showing the parts prior to assembly.

FIG. 3 is a sectional view of the swivel joint fitting removed from the assembly as seen on line 2—2 in FIG. 1.

FIGS. 4, 5 and 6 are sectional views taken on lines 4—4, 5—5 and 6—6, respectively, in FIG. 3 showing details of the interior construction, and FIG. 7 is a fragmentary side view of the swivel joint show in FIG. 3 with parts in section, the ball member, which constitutes the altitudinal component, being shown in one of its two extreme positions to effect a right angular bend.

DESCRIPTION OF THE PREFERRED EMBODIMENT

Referring in detail to the drawing, 10 denotes an alt-azimuth swivel joint fitting constructed to embody the invention seen to comprise a mounting base 11, the upper end of which extends into a housing 12, a compression spring 13, a sleeved washer 14, and a swivel ball member 15, all contained in the housing 12.

Mounting base 11 is a tubular structure having an axial bore $11a$, the lower or free end of which may have internal threads $11b$ for screw mounting onto an end of a lighting fixture or lamp conduit C in the well understood manner. The upper end of base 11 may have a bore portion $11c$ of reduced diameter to provide for an interior sleeve $11d$ upstanding from an inner shoulder $11e$. An outer shoulder $11f$ is downwardly stepped from inner shoulder $11e$, carries an upstanding pin 16, and forms a top surface for a collar $11g$ which extends radially to provide a rounded exterior undercut $11h$ shown in FIG. 2. A longitudinal exterior slot $11i$ is formed in base 11 to terminate a short distance below undercut $11h$.

Housing 12 has a central bore $12a$ which is slightly constricted at the upper end by a semi-circular slot $12b$ formed in dome $12e$ and enlarged at the lower end by counter bore $12c$ forming a shoulder $12d$ which faces and aligns with outer shoulder $11f$ of base 11. As seen in FIG. 3, collar $11g$ snugly fits into counter bore $12c$ and the rim edge $12f$ thereof is inturned or swaged around collar $11g$ and into undercut $11h$ to form an axially rotatable joint between base 11 and housing 12 as the azimuthal component of swivel 10. Shoulder $12d$ carries an upstanding pin 17 which is radially located to engage pin 16 carried on outer shoulder $11f$. Pins 16 and 17 may be made of flat spring metal rolled into split cylinders for easy insertion and retention in holes suitably drilled in the respective shoulders $11f$ and $12d$ in the well understood manner.

Swivel ball member 15 has an axial bore $15a$ extending through stem $15d$ and terminating in a central enlargement formed as a diametric slot $15b$ which divides the ball portion into a pair of spherical segments $15c$. Stem $15d$, which is generally cylindrical in shape and has external threads $15e$ thereon, is formed with opposite flattened sides $15f$ which engage the opposite planar wall surfaces of slot $15b$ to prevent relative axial rotation of ball member 15 with respect to housing 12.

Sleeved washer 14 is sized to snugly fit bore $12a$ of housing 12 and has opposite flat faces $14b$ from which coaxial short sleeves $14c$ extend surrounding axial bore $14a$. Faces $14b$ and sleeves $14c$ may be symmetrical with respect to each other to avoid the necessity for orientation of washer 14 during assembly of swivel fitting 10. As is clear from FIG. 3, edges $15g$ of spherical ball segments $15c$ ride on the upfacing washer face $14b$ with its sleeve $24c$ sized and shaped to extend into diametric slot $15b$. Compression spring 13 is sized to accommodate the opposite or downfacing sleeve $14c$ of washer 14 and the interior sleeve $11d$ of mounting base 11 in the bore thereof as centering means, flat surfaces $13a$ formed on the opposite end coils engaging washer face $14b$ and inner shoulder $11e$.

Assembly of swivel fitting 10 is readily accomplished by positioning the parts on a mandrel in the arrangement shown in FIG. 2, and bringing housing 12 down onto mounting base 11 against the action of spring 13 so that rim edge $12f$ extends below collar $11g$ for inturning by a swaging operation.

The practical operation and utility of swivel joint fitting 10 will now be apparent. After assembly, and if desired, after being polished, plated, lacquered or otherwise finished, swivel fitting 10 is ready for incorporation in a lamp construction, for example, by interposition as a universal joint between a relatively fixed electric wire conduit or lamp arm C and a lamp receptacle R, as shown in FIG. 1. Electric wiring W is easily threaded through the bore of fitting 10 when ball member 15 is disposed in axial alignment with housing 12. A nut 18 may also be threaded onto stem $15d$ to tighten against the collar of receptacle R. The portion of longitudinal slot $11i$, seen in FIGS. 1 and 3 to extend below inturned rim edge $12f$, serves as an anchoring means for the hook of a suitable spanner wrench which may be used in the well understood manner to tighten mounting base 11 on conduit C without marring the finish.

The extension of washer short sleeve 14c between ball segments 15c, which the former engages adjacent edges 15g, counteracts and prevents ball segments 15c from collapsing toward each other under the compressive force of spring 13.

In operation, alt-azimuth fitting 10 will impart substantially universal movement to receptacle R with respect to conduit C, namely, the azimuthal component as a reciprocatable axial rotation of housing 12 on base 11 through an arc of about 350°, limitation being effected by pin 17 being brought into abutment with pin 16 at opposite ends of the arc, and the altitudinal component as a pivotal movement of the ball portion of member 15 in housing 12 through an arc of 180° whereby full right angular disposition between the axes of housing 12 and member 15 is achieved in the two extreme positions of stem 15d in semicircular slot 12b as will be clear from FIG. 7.

Compression spring 13 is constructed and arranged to exert a predetermined pressure both on washer 14 and inner shoulder 11e of mounting base 11 sufficient to retain the weight of receptacle R and its light bulb and shade (not shown) in any adjusted position, yet to provide smooth pivotal movement of ball member 15 in housing 12 and smooth rotational movement of the latter with respect to mounting base 11 when changing position. To compensate for the greater frictional drag required by the altitudinal component to support a desired weight carried by stem 15d as compared to the drag required in the azimuthal component, a relatively stronger spring 13 may be used and its effect on the azimuthal component reduced by the interposition of one or more, preferably two, smooth flat thin washers between spring flat surface 13a and inner shoulder 11e. For the sake of clarity one such washer is shown in FIG. 2 seated on inner shoulder 11e. These two washers provide two additional interfaces where slippage can occur, thereby reducing the applied torque requirements for the rotational movement.

The improved alt-azimuth swivel joint fitting herein disclosed is seen to achieve the several objects of the invention and to be well adapted to meet conditions of practical use. As various possible embodiments might be made of this invention, and as various changes might be made in the disclosed construction, it is to be understood that all matters herein set forth or shown in the accompanying drawing are to be interpreted as illustrative and not in a limiting sense.

What is claimed is:

1. A swivel structure comprising a dome-shaped housing serving as an azimuthal component of the swivel and being formed with a semi-circular slot in the dome, a base in alignment with a bottom end of the housing opposite its dome, said bottom end of the housing being secured to said base for relative axial rotation only with respect thereto, a swivel ball member serving as an altitude component of the swivel and comprising a stem having one end portion adapted for connection to a receptacle and an opposite end portion terminating in a ball member positioned entirely within said dome-shaped housing with the stem extending through said semi-circular slot for pivoting movement therein through an arc of 180°, a washer coaxially mounted within the housing in abutment engagement with said swivel ball member, and a compression spring coaxially mounted within the housing and acting between the washer and said base for simultaneously providing a friction drag of predetermined force on said relatively rotary and pivoting movements.

2. The swivel defined in claim 1 in which second thin flat washer means is interposed between said spring and base to reduce the comparative friction drag on the azimuthal component.

3. The swivel defined in claim 1 in which said securing of the base and housing is a swaged rotary joint serving as the sole means for retaining the parts in assembly.

4. The swivel defined in claim 3 in which said swaged joint comprises a radial collar formed on said base and having a rounded undercut annular edge, said housing bottom end having a bore snugly engaging the collar and terminating in a free edge turned into the undercut about the rounded edge.

5. The swivel defined in claim 4 in which a longitudinal exterior slot is formed in said base extending through said radial collar to a point spaced downwardly from said swaged joint to serve as anchoring means for a spanner wrench.

6. The swivel defined in claim 3 in which said swivel ball member has an axial bore enlarged at the inner end thereof to provide a pair of spherical segments having rim edges engaging said washer, the latter having an axial sleeve extending between said spherical segments to prevent collapsing of the segments by pressure exerted by said compression spring.

7. The swivel defined in claim 6 in which said washer on its spring contacting face has a second axial sleeve symmetrical with respect to said first mentioned sleeve, said base having an axial bore and an interior sleeve surrounding said bore, said second axial sleeve and said interior sleeve extending into the core of said spring as aligning means therefor.

8. The swivel defined in claim 6 in which said swivel ball member stem, said axial bore enlargement of the ball member and said housing semi-circular slot are constructed and arranged to permit full right angular disposition between the axes of said housing and said ball member stem in the altitudinal component of the swivel.

9. The swivel defined in claim 3 in which said base has a top wall positioned within a counter bore of said housing forming a shoulder, said top wall having an inner shoulder and a stepped outer shoulder, the latter facing and being concentrically aligned with said housing shoulder and spaced therefrom, a pin upstanding from each of said aligned shoulders extending into said space to engage each other as a limit to the rotary motion.

10. The swivel defined in claim 9 in which said swivel ball member stem is formed with opposite flattened faces engaging the walls of said housing semi-circular slot to prevent relative rotation between said ball member and housing.

11. The swivel according to claim 1, wherein the swivel ball member and said base are each of larger axial extent than said housing.

* * * * *